United States Patent
Kormann et al.

(10) Patent No.: US 9,650,745 B2
(45) Date of Patent: May 16, 2017

(54) OIL-IN-WATER EMULSIONS

(75) Inventors: Claudius Kormann, Schifferstadt (DE); Wolfgang Gaschler, Shanghai (CN); Christian Holtze, Mannheim (DE)

(73) Assignee: BASF SE, Ludwigshafen (DE)

( * ) Notice: Subject to any disclaimer, the term of this patent is extended or adjusted under 35 U.S.C. 154(b) by 563 days.

(21) Appl. No.: 14/116,577

(22) PCT Filed: May 9, 2012

(86) PCT No.: PCT/EP2012/058497
§ 371 (c)(1),
(2), (4) Date: Nov. 8, 2013

(87) PCT Pub. No.: WO2012/152810
PCT Pub. Date: Nov. 15, 2012

(65) Prior Publication Data
US 2014/0107229 A1  Apr. 17, 2014

Related U.S. Application Data

(60) Provisional application No. 61/484,273, filed on May 10, 2011.

(30) Foreign Application Priority Data

May 10, 2011  (EP) ..................... 11165568

(51) Int. Cl.
B01D 19/04  (2006.01)
D21H 21/12  (2006.01)
D21C 3/28  (2006.01)

(52) U.S. Cl.
CPC ......... D21H 21/12 (2013.01); B01D 19/0404 (2013.01); D21C 3/28 (2013.01)

(58) Field of Classification Search
CPC ........ D21H 21/14; D21H 21/12; B01D 19/04; B01D 19/0404; D21C 3/28
USPC ............ 516/73, 133; 162/173, 179, 75, 162, 162/164.7
See application file for complete search history.

(56) References Cited

U.S. PATENT DOCUMENTS

| | | | | |
|---|---|---|---|---|
| 2,346,928 A * | 4/1944 | Lighthipe | .......... | B01D 19/0404 106/148.51 |
| 4,009,119 A * | 2/1977 | Poschmann | ........ | B01D 19/0404 516/132 |
| 4,664,844 A | 5/1987 | Bergold et al. | | |
| 4,950,420 A | 8/1990 | Svarz | | |
| 5,326,499 A | 7/1994 | Wegner et al. | | |
| 5,744,066 A * | 4/1998 | Oppenlander | ..... | B01D 19/0404 516/132 |
| 7,622,021 B1 * | 11/2009 | Baumoeller | .......... | A61K 8/0208 162/135 |
| 7,763,664 B2 * | 7/2010 | Bonn | ................. | B01D 19/0404 106/504 |
| 2006/0063877 A1 * | 3/2006 | Gaschler | ................ | D21H 19/58 524/487 |
| 2006/0276554 A1 * | 12/2006 | Dyllick-Brenzinger | ........ | B01D 19/0404 516/137 |
| 2010/0212847 A1 | 8/2010 | Hamers et al. | | |
| 2013/0303635 A1 * | 11/2013 | Gaschler | ............ | B01D 19/0404 516/29 |

FOREIGN PATENT DOCUMENTS

| | | |
|---|---|---|
| DE | 2157033 | 5/1973 |
| DE | 38 42 692 | 6/1990 |
| DE | 41 27 719 | 2/1993 |
| DE | 101 27 245 | 12/2002 |
| EP | 0 112 592 | 7/1984 |
| EP | 0 149 812 | 7/1985 |
| EP | 0 531 713 | 3/1993 |
| WO | 94 08091 | 4/1994 |
| WO | 96 34903 | 11/1996 |
| WO | 2009 050138 | 4/2009 |
| WO | 2010 108859 | 9/2010 |
| WO | 2012 095393 | 7/2012 |

OTHER PUBLICATIONS

Hawley's Condensed Chemical Dictionary, (2007), 499, John Wiley & Sons, Inc. Online @ http://onlinelibrary.wiley.com/book/10.1002/9780470114735/titles headwords = Emulsion, (downloaded Jan. 9, 2016).*

(Continued)

*Primary Examiner* — Daniel S Metzmaier
(74) *Attorney, Agent, or Firm* — Oblon, McClelland, Maier & Neustadt, L.L.P.

(57) ABSTRACT

The invention relates to oil-in-water emulsions based on fatty alcohols and mono- or diesters of glycerol and the use thereof as antifoams or deaerators for aqueous compositions. The oil phase of the emulsions according to the invention consists to at least 95% by weight of the following constituents: a) 40 to 95% by weight, based on the total weight of the oil phase, of a mixture of at least two alcohols as component A, consisting of: a1) at least one alkanol having 12 to 30 carbon atoms as component A1, a2) at least one mono- or diester of glycerol with at least one fatty acid having 14 to 24 carbon atoms as component A2; b) 0.1 to 10% by weight, based on the total weight of the oil phase, of at least one further component B, which is selected from esters of $C_{12}$-$C_{36}$-alkanecarboxylic acids with polyglycerol, amides of $C_{12}$-$C_{36}$-alkanecarboxylic acids with alkylenediamines or oligoalkyleneamines, and esters of $C_{12}$-$C_{36}$-alkanecarboxylic acids with $C_{12}$-$C_{36}$-alkanols, and mixtures thereof, c) 4.9 to 50% by weight, based on the total weight of the oil phase, of at least one further component C, which is selected from organic substances which are liquid at 50° C. and 1013 mbar, at atmospheric pressure have a boiling point above 200° C., and at 25° C. and 1013 mbar have a solubility in water of less than 0.1 g/l.

14 Claims, No Drawings

(56) References Cited

OTHER PUBLICATIONS

The Merck Index—Online, Monograph IDs: M4721, M7691, M3297, M10444, M8194, M1020, M4714, M8126, (alcohols), The Merck Index, Merck Sharp & Dohme Corp., subsidiary of Merck & Co., Inc., Whitehouse Station, N.J., U.S.A., Online @ https://www.rsc.org/Merck-Index/ , pp. 1-8.*

The Merck Index—Online, Monograph IDs: M11166, M11178, M11202, M8574, M8574, M3716, M11174, (Triglycerides, fatty acid), The Merck Index, Merck Sharp & Dohme Corp., subsidiary of Merck & Co., Inc., Whitehouse Station, N.J., U.S.A., Online @ https://www.rsc.org/Merck-lndex/ , pp. 1-7.*

Joshi K. S., et al. "Influence of fatty alcohol antifoam suspensions on foam stability" Colloids and Surfaces A: Physicochem. Eng. Aspects, vol. 263, pp. 239-249, 2005.

International Search Report Issued Sep. 5, 2012 in PCT/EP12/058497 Filed May 9, 2012.

* cited by examiner

OIL-IN-WATER EMULSIONS

The invention relates to oil-in-water emulsions based on fatty alcohols and mono- or diesters of glycerol and to the use thereof as antifoams or deaerators for aqueous compositions.

In numerous industrial processes, it is necessary to handle aqueous solutions and suspensions which have a tendency toward foam formation on account of their ingredients. This foam formation makes the process difficult to carry out and therefore has to be kept as low as possible or avoided altogether. Examples of foam-forming aqueous compositions are detergent-comprising compositions, saponin-comprising compositions, wastewater in water treatment plants, protein-comprising compositions such as soybean extracts and in particular paper stock suspensions, e.g. groundwood- and/or cellulose-comprising suspensions, as are used in particular in the paper industry for producing paper, board or cardboard.

Besides the formation of foam, which is permanently after-formed from coalescing air bubbles, the air incorporated in these systems, which is in a finely dispersed, stable form, also proves to be problematical. The reduction in the air content of these systems is therefore likewise of particular importance.

For these reasons, so-called antifoams and/or deaerators are added to the film-forming aqueous compositions during their processing and sometimes even during their production; these antifoams and/or deaerators, even at low use concentrations, suppress the undesired formation of foam, reduce the content of incorporated air or destroy foam which has already been produced.

The antifoams known from the prior art are often aqueous compositions based on oil-in-water dispersions or emulsions, the oil phase of which comprises at least one hydrophobic substance, for example mineral oils, silicone oils, polyalkylene oxides, esters thereof with fatty acids and ethers thereof with long-chain alcohols, native fats and/or oils, waxes, ester waxes or long-chain alcohols. Occasionally, the use of distillation residues which are formed during the production of long-chain alcohols in accordance with the Ziegler process or during oxo synthesis has also been reported (see e.g. EP-A 149812).

U.S. Pat. No. 4,950,420 discloses antifoams for the paper industry which comprise 10 to 90% by weight of a surface-active polyether, such as polyoxalkylated glycerol or polyalkoxylated sorbitol, and 10 to 90% by weight of a fatty acid ester of polyhydric alcohols, such as mono- and diesters of polyethylene glycol or polypropylene glycol.

EP 0531713 and WO 94/08091 describe antifoams for the paper industry based on oil-in-water emulsions, the oil phases of which comprise alcohols, fatty acid esters, distillation residues, hydrocarbons in combination with polyglycerol esters.

DE 2157033 describes antifoams based on aqueous emulsions which comprise $C_{12}$-$C_{22}$-alkanols and/or $C_{12}$-$C_{22}$-fatty acid esters of di- to trihydric alcohols and paraffin oil or $C_{12}$-$C_{22}$-fatty acids.

Joshi et al. established in Colloids and Surfaces A: Physicochem. Eng. Aspects 263 (2005) 239-249 that the effectiveness of an antifoam based on fatty alcohol depends on its aggregate state. The effectiveness is highest if it is partly molten. This gives rise in the specialist field to the requirement to use mixtures of fatty acid alcohols which, being mixtures, have a broader melting range than pure substances.

In the prior art, the effectiveness of an antifoam is often measured by its ability to suppress foam formation at a liquid surface. Particularly in papermaking, however, it is more important to reduce the air content in the aqueous liquids produced during papermaking, particularly in the paper stock suspensions. Antifoams which are likewise able to act as deaerators are not often described in the prior art. The known antifoams often leave something to be desired with regard to the deaerating effect, particularly at temperatures below 50° C., e.g. in the range from 20 to 50° C.

The object of the present invention is to provide compositions which have high effectiveness both as antifoam and also as deaerator for aqueous compositions, in particular for aqueous paper stock suspensions.

These and other objects are achieved by oil-in-water emulsions, the oil phase of which consists to at least 95% by weight of the following constituents:
a) 40 to 95% by weight, based on the total weight of the oil phase, of a mixture of at least two alcohols as component A, consisting of:
   a1) at least one alkanol having 12 to 30 carbon atoms as component A1,
   a2) at least one mono- or diester of glycerol with at least one fatty acid having 14 to 24 carbon atoms as component A2;
b) 0.1 to 10% by weight, based on the total weight of the oil phase, of at least one further component B, which is selected from esters of $C_{12}$-$C_{36}$-alkanecarboxylic acids with polyglycerol, amides of $C_{12}$-$C_{36}$-alkanecarboxylic acids with alkylenediamines or oligoalkyleneamines, and esters of $C_{12}$-$C_{36}$-alkanecarboxylic acids with $C_{12}$-$C_{36}$-alkanols, and mixtures thereof,
c) 4.9 to 50% by weight, based on the total weight of the oil phase, of at least one further component C, which is selected from organic substances which are liquid at 50° C. and 1013 mbar, at atmospheric pressure have a boiling point above 200° C., and at 25° C. and 1013 mbar have a solubility in water of less than 0.1 g/l.

Component A1 are preferably essentially unbranched alkanols having 12 to 30, preferably 14 to 28, in particular 16 to 26, specifically 18 to 24, carbon atoms, i.e. saturated alcohols having 12 to 30, preferably 14 to 28, in particular 16 to 26, specifically 18 to 24, carbon atoms, which are linear to at least 80%, in particular at least 90% and specifically at least 95% and accordingly can be described by the following formula:

$$H\text{—}(CH_2)_n\text{—}OH$$

in which n is an integer in the range from 18 to 24. The fraction of alkanols, in particular linear alkanols having 12 to 30, preferably 14 to 28, in particular 16 to 26 carbon atoms, specifically 18 to 24 carbon atoms, is generally at least 80% by weight, in particular at least 90% by weight, specifically at least 95% by weight or at least 99% by weight, based on the total weight of component A1. Examples of alcohols suitable as component A1 are inter alia lauryl alcohol, myristyl alcohol, palmityl alcohol (cetyl alcohol), 1-heptadecanol, stearyl alcohol, arachyl alcohol (n-eicosanol), behenyl alcohol, lignoceryl alcohol, cerotyl alcohol and mixtures thereof. Preferably, component A consists to at least 80%, in particular at least 90% and specifically at least 95%, of one of the following alkanols or mixtures thereof: stearyl alcohol, arachyl alcohol, behenyl alcohol or lignoceryl alcohol.

Furthermore, component A1 preferably comprises less than 10% by weight, in particular less than 5% by weight, specifically less than 1% by weight or less than 0.5% by weight, based on component A1, of alcohols having more than 30 carbon atoms or less than 12 carbon atoms.

In a likewise preferred embodiment, arachyl alcohol, behenyl alcohol, lignoceryl alcohol or a mixture of these alcohols is used as component A1, whereas the component A1 is essentially free from alcohols having more than 30 carbon atoms or less than 12 carbon atoms, i.e. comprises less than 0.5% by weight, based on the component A1, of alcohols which have more than 30 carbon atoms or less than 12 carbon atoms.

The fraction of component A1 in component A is generally in the range from 20 to 80% by weight, preferably 25 to 75% by weight, in particular 33 to 66% by weight, based on the total amount of component A.

In one preferred embodiment, the components A1 and A2 are used in a weight ratio in the range from 4:1 to 1:4, in particular 3:1 to 1:3 and specifically 2:1 to 1:2.

Component A2 is a mono- or diester of glycerol with at least one fatty acid which has 14 to 24, in particular 16 to 22 and specifically 18 to 22, carbon atoms, or a mixture of mono- or diesters. A monoester of glycerol is understood as meaning a glycerol ester in which one of the 3 hydroxyl groups is present in esterified form. Substances of this type are also referred to as monoglycerides. A diester of glycerol is understood as meaning a glycerol ester in which 2 of the 3 hydroxyl groups are present in esterified form. Substances of this type are also referred to as diglycerides. As regards production, mono- and diesters are often in the form of mixtures. As a result of production, the component A2 may also comprise small fractions of triglycerides and glycerol, in which case their fractions as a rule in each case constitute not more than 10% by weight, in particular not more than 5% by weight, specifically not more than 1% by weight, of component A2.

The acid components of the mono- and/or diglycerides of component A2 may either be saturated fatty acids or unsaturated fatty acids and mixtures thereof. Preferably, the fatty acids are linear to at least 70% by weight, in particular at least 80% by weight, specifically at least 95% by weight, based on the total amount of fatty acids used. Suitable fatty acids are preferably selected from saturated, linear fatty acids having 14 to 24, in particular 16 to 22, specifically 18 to 22, carbon atoms. Examples of suitable saturated, linear fatty acids are myristic acid, palmitic acid, stearic acid, arachic acid and behenic acid. Examples of suitable unsaturated, linear fatty acids are oleic acid, hexadecenoic acids, elaidic acid, eicosenic acids and docosenoic acids such as erucic acid or brassidic acid, and also polyunsaturated, linear acids such as octadecenedienoic acids and octatrienoic acids such as linoleic acid and linolenic acid, and mixtures of said saturated and unsaturated carboxylic acids. Preferably, the component A2 is selected from the mono- and diesters of glycerol with saturated, preferably linear, carboxylic acids having 16 to 22 carbon atoms, in particular from palmitic acid, stearic acid and behenic acid and mixtures thereof. Preferably, the mono- and diesters of glycerol used as component A2 have a low iodine number, namely an iodine number of at most 5 g of $I_2$ per 100 grams and very preferably of at most 2 grams of $I_2$ per 100 gram of ester.

In a preferred embodiment, the component A2 consists to at least 80% by weight, preferably at least 90% by weight, in particular at least 95% by weight, based on the total amount of component A2, of one or more mono- or diesters, preferably of one or more mono- or diesters of palmitic acid, of stearic acid or of behenic acid. Preference is given to using technical-grade mixtures of these mono- or diesters as component A2.

The component A2 regularly comprises less than 20% by weight, preferably less than 10% by weight, in particular less than 5% by weight and specifically less than 1% by weight, based on the total amount of component A2, of glycerol and triglycerides. The acid number of component A2 is generally not more than 10 mg KOH/g.

In a particularly preferred embodiment, the component A2 consists to at least 80% by weight, preferably at least 90% by weight, in particular at least 95% by weight, based on the total amount of component A2, of mono- and diesters of glycerol and comprises less than 20% by weight, preferably less than 10% by weight, in particular less than 5% by weight and specifically less than 1% by weight, based on the total amount of component A2, of glycerol and triester of glycerol.

The fraction of component A2 in component A is generally in the range from 20 to 80% by weight, preferably 25 to 75% by weight, in particular 33 to 66% by weight, based on the total amount of component A.

The fraction of component A, i.e. the fraction of the total amount of the constituents A1 and A2 in the oil phase is, according to the invention, in the range from 40 to 95% by weight, preferably 50 to 80% by weight, in particular 60 to 70% by weight, based on the total weight of the oil phase.

The component B is selected from esters of $C_{12}$-$C_{36}$-alkanecarboxylic acids with polyglycerol, amides of $C_{12}$-$C_{36}$-alkanecarboxylic acids with alkylenediamines or oligoalkyleneamines, esters of $C_{12}$-$C_{36}$-alkanecarboxylic acids with $C_{12}$-$C_{36}$-alkanols and mixtures thereof. As a result of the production, the component B can comprise small amounts of $C_{12}$-$C_{36}$-alkanecarboxylic acids. Preferably, the acid number of component B is not more than 10 mg KOH/g. Preferably, the component B has a low iodine number, namely an iodine number of at most 10 g of $I_2$ per 100 grams.

Esters of alkanecarboxylic acids with polyglycerol are understood as meaning a polyglycerol esterified with at least one fatty acid which has 12 to 36, in particular 16 to 30, specifically 18 to 24, carbon atoms. The fatty acids contemplated for the esterification of the polyglycerol may either be saturated fatty acids or unsaturated fatty acids and mixtures thereof. Fatty acids suitable for the esterification of the polyglycerol mixtures are preferably selected from saturated fatty acids having 12 to 36, in particular 16 to 30, specifically 18 to 24, carbon atoms. Examples of suitable saturated fatty acids are lauric acid, myristic acid, palmitic acid, stearic acid, arachic acid, behenic acid and montan wax acid. Examples of suitable unsaturated fatty acids are oleic acid, hexadecanoic acids, elaidic acid, eicosenoic acids and docosenoic acids such as erucic acid or brassidic acid, and also polyunsaturated acids, such as octadecenedienoic acids and octatrienoic acids, such as linoleic acid and linolenic acid, and mixtures of the specified saturated and unsaturated carboxylic acids. Preferably, the polyglycerol is esterified with saturated carboxylic acids having 18 to 24 carbon atoms, which is selected in particular from palmitic acid, stearic acid and behenic acid and mixtures thereof. In a specific embodiment, the polyglycerol ester is a polyglycerol esterified with behenic acid.

A polyglycerol is understood as meaning oligomers of glycerol which comprise at least 50% by weight, in particular at least 60% by weight, of di-, tri- or tetraglycerol or higher glycerol oligomers. Preferred polyglycerols comprise 15 to 40% by weight of diglycerol, 30 to 55% by weight of triglycerol and 10 to 25% by weight of tetraglycerol, in each case based on the total amount of polyglycerol, where the total amount of di-, tri and tetraglycerol preferably constitutes at least 60% by weight.

The degree of esterification of the polyglycerol esters is generally 20 to 100%, preferably 60 to 100%, based on the number of hydroxyl functions in the polyglycerol. The acid number of the polyglycerol ester is generally not more than 10 mg KOH/g. Preferably, the polyglycerol ester has a low iodine number, namely an iodine number of at most 10 g of $I_2$ per 100 grams of polyglycerol ester.

Preferred polyglycerol esters are in particular those which are obtainable by esterifying polyglycerol mixtures which comprise 15 to 40% by weight of diglycerol, 30 to 55% by weight of triglycerol and 10 to 25% by weight of tetraglycerol, in each case based on the total amount of the polyglycerol, where the total amount of di-, tri- and tetraglycerol constitutes at least 60% by weight. In particular, mixtures with the following composition are used for the esterification:

0 to 10% by weight of glycerol,
15 to 40% by weight of diglycerol,
30 to 55% by weight of triglycerol,
10 to 25% by weight of tetraglycerol,
0 to 15% by weight of pentaglycerol,
0 to 10% by weight of hexaglycerol and
0 to 5% by weight of more highly condensed polyglycerols.

In particular, the polyglycerol esters are those which are obtainable by esterifying one of the polyglycerol mixtures described above with at least one saturated carboxylic acid having 18 to 24 carbon atoms, the carboxylic acid being selected in particular from palmitic acid, stearic acid and behenic acid and mixtures thereof, with behenic acid being particularly preferred.

Particular preference is given to using polyglycerol esters which are obtainable from the esterification of behenic acid with a polyglycerol mixture consisting of 0 to 10% by weight of glycerol, 15 to 40% by weight of diglycerol, 30 to 55% by weight of triglycerol, 10 to 25% by weight of tetraglycerol, 0 to 15% by weight of pentaglycerol, 0 to 10% by weight of hexaglycerol and 0 to 5% by weight of more highly condensed polyglycerols.

The polyglycerol mixtures used for the esterification are accessible for example by alkaline catalyzed condensation of glycerol at elevated temperatures (cf. e.g. Fette, Seifen, Anstrichmittel, 88th volume, No. 3, pages 101 to 106 (1986)) or as in DE-A 3 842 692 by reaction of glycerol with epichlorohydrin in the presence of acidic catalysts at elevated temperatures. However, the mixtures are also obtainable by mixing together the pure polyglycerol components, e.g. diglycerol, triglycerol and tetraglycerol.

The polyglycerols esterified with alkanecarboxylic acids are known, e.g. from EP 0531713 and WO 94/08091. They are typically prepared by esterification of polyglycerol, in particular by esterification of the polyglycerol mixtures described above, with the desired fatty acid or mixture of fatty acids or ester-forming derivatives thereof, e.g. $C_1$-$C_4$-alkyl esters thereof, by methods known per se. As a rule, the procedure is carried out in the presence of an acidic esterification catalyst such as sulfuric acid, p-toluenesulfonic acid, citric acid, phosphorous acid, phosphoric acid, hypophosphorous acid or basic catalysts, such as sodium methylate or potassium tert-butylate.

Also suitable as component B are amides of $C_{12}$-$C_{36}$-alkanecarboxylic acids with alkylenediamines, oligoalkyleneamines and mixtures thereof. These amides are understood as meaning substances which are obtainable by amidation of at least one, preferably saturated, mono- to dibasic, preferably monobasic, fatty acid having 12 to 36, in particular 16 to 30, specifically 18 to 24, carbon atoms with an amine selected from alkylenediamines and oligoalkyleneamines. Substances of this type are known e.g. from DE 101 27 245. The acid number of the amides of $C_{12}$-$C_{36}$-alkanecarboxylic acids is generally not more than 10 mg KOH/g.

Amines suitable for the amidation are alkylenediamines, oligoalkyleneamines and mixtures thereof. Alkylenediamines are understood as meaning compounds which have two amino functions linked via a linear or branched alkylene group, where the alkylene group can be interrupted by 2, 3 or 4 non-adjacent oxygen atoms. Alkylenediamines are preferably linear and the amino functions are preferably terminal. Accordingly, alkylenediamines can be described in particular by the following formula:

in which A is an alkylene group having in general 2 to 10 carbon atoms, where 1, 2, 3 or 4 non-adjacent $CH_2$ groups can be replaced by oxygen. Examples are ethylenediamine, 1,3-propylenediamine, 1,4-butylenediamine, 1,5-pentylenediamine and hexamethylenediamine, and 2-(2-aminoethoxy)ethylamine, 2-[2-(2-aminoethoxy)ethoxy]ethylamine, 3-(3-aminopropoxy)propylamine, 3-[2-(3-aminopropoxy)ethoxy]propylamine or 2-[3-(2-aminoethoxy)propoxy]ethylamine.

Oligoalkyleneamines are understood as meaning compounds having as a rule two terminal amino groups which are interrupted by at least one imino group (NH). Preferably, oligoalkyleneamines can be described by the following formula:

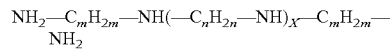

in which n and m, independently of one another, are an integer in the range from 2 to 10, preferably 2 to 8, in particular 2 to 6, and X is an integer in the range from 0 to 50, preferably from 0 to 20, in particular 0 to 10. In a preferred embodiment, m and n, independently of one another, are 2 or 3 and X is 0, 1 or 2. In particular, m is 3, n is 2 and X is 1 (3-[2-(3-aminopropylamino)ethylamino]propylamine) or m is 2 and X is 0 (diethylenetriamine) or m and n are 2 and X is 1 (triethylenetetramine).

Examples of preferred alkylenediamines and oligoalkyleneamines are diethylenetriamine, triethylenetetramine, 3-[2-(3-aminopropylamino)ethylamino]propylamine, 2-(2-aminoethoxy)ethylamine, 2-[2-(2-aminoethoxy)ethoxy]ethylamine, 3-(3-aminopropoxy)-propylamine, 3-[2-(3-aminopropoxy)ethoxy]propylamine or 2-[3-(2-aminoethoxy)-propoxy]ethylamine and mixtures thereof.

As component B, it is also possible to use mixtures of amides of $C_{12}$-$C_{36}$-alkanecarboxylic acids with alkylenediamines, oligoalkyleneamines or mixtures thereof.

Further suitable as component B are esters of $C_{12}$-$C_{36}$-alkanecarboxylic acids with $C_{12}$-$C_{36}$-alkanols. These are understood as meaning substances which are obtainable by esterification of at least one, preferably saturated, mono- to dibasic, preferably monobasic, alkanecarboxylic acid having 12 to 36, in particular 16 to 30, specifically 18 to 24, carbon atoms with a $C_{12}$-$C_{36}$-alkanol. The alkanols suitable for the esterification are preferably saturated, linear and mono- to dihydric, in particular monohydric. They have 12 to 36, in particular 16 to 30, specifically 18 to 24, carbon atoms. It is also possible to use mixtures of alkyl esters of alkanoic acids. Suitable examples of alkyl esters of alkanoic acids are palmityl palmitate, stearyl stearate, arachyl arachate, behenyl behenate and lignoceryl lignocerate. Preferred esters of $C_{12}$-$C_{36}$-alkanecarboxylic acids with $C_{12}$-$C_{36}$-alkanols are behenyl behenate and stearyl stearate and mixtures thereof.

In one preferred embodiment, component B comprises at least one of the above-described esters of alkanecarboxylic acids with polyglycerol (also referred to below as polyglycerol esters), in particular at least one of the polyglycerol esters stated as being preferred or particularly preferred. In one preferred embodiment, component B comprises at least one of the above-described polyglycerol esters which is obtainable by esterification of the above-described polyglycerol with at least one saturated carboxylic acid having 18 to 24 carbon atoms, where the carboxylic acid is selected in particular from palmitic acid, stearic acid and behenic acid and mixtures thereof. In one particularly preferred embodiment, component B comprises at least one of the above-described polyglycerol esters which is obtainable by esterification of behenic acid with a polyglycerol mixture consisting of 0 to 10% by weight of glycerol, 15 to 40% by weight of diglycerol, 30 to 55% by weight of triglycerol, 10 to 25% by weight of tetraglycerol, 0 to 15% by weight of pentaglycerol, 0 to 10% by weight of hexaglycerol and 0 to 5% by weight of more highly condensed polyglycerols.

In one preferred embodiment, component B consists to at least 80% by weight, in particular to at least 90% by weight, specifically to at least 95% by weight, based on the total weight of component B, or exclusively of at least one of the above-described polyglycerol esters, in particular at least one of the polyglycerol esters stated as being preferred or particularly preferred. In one particularly preferred embodiment, component B consists to at least 80% by weight, in particular to at least 90% by weight, specifically to at least 95% by weight, based on the total weight of component B, or exclusively of at least one of the above-described polyglycerol esters which is obtainable by esterification of the above-described polyglycerol with at least one saturated carboxylic acid having 18 to 24 carbon atoms, where the carboxylic acid is selected in particular from palmitic acid, stearic acid and behenic acid and mixtures thereof. In one particularly preferred embodiment, component B consists to at least 80% by weight, in particular to at least 90% by weight, specifically to at least 95% by weight, based on the total weight of component B, or exclusively of at least one of the above-described polyglycerol esters which is obtainable by esterification of behenic acid with a polyglycerol mixture consisting of 0 to 10% by weight of glycerol, 15 to 40% by weight of diglycerol, 30 to 55% by weight of triglycerol, 10 to 25% by weight of tetraglycerol, 0 to 15% by weight of pentaglycerol, 0 to 10% by weight of hexaglycerol and 0 to 5% by weight of more highly condensed polyglycerols.

According to the invention, the fraction of component B in the oil phase is 0.1 to 10% by weight, preferably 2 to 8% by weight, in particular 3 to 6% by weight, based on the total weight of the oil phase.

Component C present in the oil-in-water emulsions according to the invention is one or more organic substances which are liquid at 50° C. and 1013 mbar, at atmospheric pressure have a boiling point above 200° C., e.g. in the range from 200 to 400° C., in particular at least 250° C., and which at 25° C. and 1013 mbar are essentially insoluble in water, i.e. have a solubility in water of less than 0.1 g/l. Suitable substances are hydrocarbons and triglycerides of fatty acids, in particular those having 12 to 22 carbon atoms. Component C preferably consists to at least 80% by weight, in particular 90% by weight, specifically 95% by weight, based on the total weight of component C, of one or more hydrocarbons, which are in particular nonaromatic, i.e. aliphatic or cycloaliphatic, and have a boiling point of at least 200° C., preferably at least 250° C., e.g. in the range from 200 to 400° C. or 250 to 400° C. at 1.013 bar, such as vegetable and animal oils and aliphatic hydrocarbons, for example liquid paraffins, white oils, soft paraffins or other standard commercial mineral oils.

According to the invention, the fraction of component C in the oil phase is 4.9 to 49% by weight, preferably 20 to 40, in particular 25 to 35% by weight, based on the total weight of the oil phase.

To stabilize the oil phase in the aqueous emulsion, the emulsions according to the invention advantageously comprise at least one surface-active substance. The emulsions according to the invention comprise at least one surface-active substance generally in an amount from 0.1 to 10% by weight, in particular in an amount from 0.5 to 5% by weight, based on the oil phase.

Suitable surface-active substances are, in principle, all substances known for the stabilization of hydrophobic particles or droplets in aqueous systems, e.g. anionic, cationic, amphoteric and/or nonionic emulsifiers, and also water-soluble ionic and nonionic polymers, preferably ionically amphiphilic copolymers which have cationic or anionic groups and whose molecular weight, in contrast to the emulsifiers, is usually above 1000 daltons. Surface-active substances are sufficiently known to the person skilled in the art, e.g. from Ullmann's Encyclopedia of Industrial Chemistry, 5th ed. vol. A9, pp. 297-339.

Examples of suitable anionic emulsifiers are:
salts, in particular sodium and ammonium salts, of higher fatty acids,
salts, in particular the sodium and ammonium salts, of sulfated ethoxylation products of $C_6$-$C_{22}$-alkylphenols, such as nonylphenol or octylphenol,
salts, in particular the sodium and ammonium salts, of $C_4$-$C_{22}$-alkylarylsulfonates,
salts, in particular the sodium and ammonium salts, of sulfonates of naphthalene,
salts, in particular the sodium and ammonium salts, of sulfonated $C_8$-$C_{22}$-alkyldiphenyl oxides, in particular of bis-sulfonated $C_8$-$C_{22}$-alkyldiphenyl oxides, such as bis-sulfonated dodecyldiphenyl oxide,
salts, in particular the sodium and ammonium salts, of naphthalenesulfonic acid-formaldehyde condensates or naphthalenesulfonic acid-formaldehyde-urea condensates,
and also salts, in particular the sodium and ammonium salts, of di-$C_4$-$C_{20}$-alkyl sulfosuccinates.

Examples of suitable nonionic emulsifiers are:
alkoxylated $C_6$-$C_{22}$-alkylphenols with a degree of ethoxylation preferably in the range from 5 to 50,
oxyethylated unsaturated oils such as reaction products of one mole of castor oil and 30 to 40 mol of ethylene oxide, and
adduct formation products of ethylene oxide and/or propylene oxide with aliphatic alcohols having as a rule 12 to 20 carbon atoms, e.g. with fatty alcohols, with polyhydric alcohols, with amines, and also with carboxylic acids.

The emulsions according to the invention preferably comprise at least one emulsifier, in particular at least one anionic emulsifier in an amount of from 0.1 to 10% by weight, in particular in an amount of from 0.5 to 5% by weight, based on the oil phase. In one specific embodiment, the emulsions according to the invention comprise at least one anionic emulsifier selected from the salts, in particular the sodium and ammonium salts of sulfated ethoxylation products of $C_6$-$C_{22}$-alkylphenols.

Examples of surface-active anionic polymers are homopolymers of acrylic acid, homopolymers of methacrylic acid, copolymers of acrylic acid and methacrylic acid in any desired molar ratio, copolymers of acrylic acid and maleic acid in any desired molar ratio, copolymers of methacrylic acid and maleic acid, polyvinylsulfonic acid, polyacrylamido-2-methylpropanesulfonic acid, styrenesulfonic acid, copolymers of acrylic acid and acrylamide or methacrylamide, copolymers of methacrylic acid and acrylamide or methacrylamide, or the alkali metal and ammonium salts of the specified polymers with molar masses of, for example, 1500 to 300 000.

Preferred anionic surface-active polymers are amphiphilic copolymers comprising acid groups and comprising, in copolymerized form,
(a) hydrophobic monoethylenically unsaturated monomers and
(b) monoethylenically unsaturated carboxylic acids, monoethylenically unsaturated sulfonic acids, monoethylenically unsaturated phosphonic acids or mixtures thereof, and optionally monomers (c) different therefrom and also the salts, in particular the sodium and the ammonium salts.

Examples of hydrophobic monoethylenically unsaturated monomers are: styrene, methylstyrene, ethylstyrene, acrylonitrile, methacrylonitrile, $C_2$- to $C_{18}$-olefins, esters of monoethylenically unsaturated $C_3$- to $C_5$-carboxylic acids and monohydric alcohols, vinyl alkyl ethers, vinyl esters or mixtures thereof. From this group of monomers, preference is given to using isobutene, diisobutene, styrene and acrylic acid esters such as ethyl acrylate, isopropyl acrylate, n-butyl acrylate and sec-butyl acrylate.

Examples of monomers (b) are: acrylic acid, methacrylic acid, maleic acid, maleic anhydride, fumaric acid, itaconic acid, vinylsulfonic acid, 2-acrylamidomethylpropane-sulfonic acid, acrylamidopropane-3-sulfonic acid, 3-sulfopropyl acrylate, 3-sulfopropyl methacrylate, styrenesulfonic acid, vinylphosphonic acid or mixtures thereof in copolymerized form, with preference being given to acrylic acid, methacrylic acid and maleic acid and also its anhydride.

The molar mass of the amphiphilic copolymers is generally 1000 to 100 000 and is preferably in the range from 1500 to 10 000. The acid numbers of the anionic amphiphilic copolymers are generally 50 to 500, preferably 150 to 350 mg KOH/g.

Suitable surface-active polymers for stabilizing the compositions according to the invention are also:
graft polymers of 5 to 40 parts by weight of N-vinylformamide per 100 parts by weight of a polyalkylene glycol with a molar mass of from 500 to 10 000,
zwitterionic polyalkylenepolyamines,
zwitterionic polyethyleneimines,
zwitterionic polyetherpolyamines or
zwitterionic crosslinked polyalkylenepolyamines.

Graft polymers of N-vinylformamide on polyalkylene glycols are described, for example, in WO-A-96/34903. The grafted-on vinylformamide units may optionally be up to 10% hydrolyzed. The fraction of grafted-on vinylformamide units is preferably 20 to 40% by weight, based on polyalkylene glycol. Preference is given to using polyethylene glycols with molar masses of from 2000 to 10 000.

Zwitterionic polyalkylenepolyamines and zwitterionic polyethyleneimines are known, for example, from EP-B 112592. Such compounds are obtainable, for example, by firstly alkoxylating a polyalkylenepolyamine or polyethyleneimine, e.g. with ethylene oxide, propylene oxide and/or butylene oxide, and then quaternizing the alkoxylation products, e.g. with methyl bromide or dimethyl sulfate and then sulfating the quaternized alkoxylated products with chlorosulfonic acid or sulfur trioxide. The molar mass of the zwitterionic polyalkylenepolyamines is, for example, 1000 to 9000, preferably 1500 to 7500. The zwitterionic polyethyleneimines preferably have molar masses in the range from 2000 to 1700 daltons.

The compositions according to the invention preferably comprise at least one anionic surface-active substance. This is preferably selected from the aforementioned anionic emulsifiers, the aforementioned acid-carrying, water-soluble polymers and mixtures thereof.

For the stability of the emulsions according to the invention, it has proven advantageous if they comprise 0.05 to 8% by weight, in particular 0.1 to 5% by weight, based on the oil phase, of at least one acid-having water-soluble homo- or copolymer, preferably of a salt thereof and optionally at least one anionic emulsifier. The emulsifiers are preferably likewise used in an amount of from 0.05 to 5% by weight, based on the total weight of the oil phase. In particular, those emulsions which comprise at least one anionic emulsifier and at least one of the aforementioned acid-carrying water-soluble polymers are advantageous.

Besides the oil phase, the emulsions according to the invention can comprise, as further disperse constituent, finely divided, virtually water-insoluble, inert solids with particle sizes <20 µm, preferably from 0.1 to 10 µm, in an amount of, for example, 0.1 to 50%, preferably 1 to 35% of the weight of the oil phase of the oil-in-water emulsions. According to the invention, the solids content of the emulsion is in a range from 10 to 50% by weight, in particular 15 to 45% by weight, specifically 20 to 40% by weight. Suitable inert solids are e.g. kaolin, chalk, bentonite, talc, barium sulfate, silicon dioxide, zeolites, urea-formaldehyde pigments, melamine-formaldehyde pigments and microcrystalline cellulose, where the inert inorganic pigments may also be hydrophobized, e.g. by treatment with trialkylsilyl halides. In one preferred embodiment of the invention, the emulsions comprise no finely divided, virtually water-insoluble, inert solids different from components A, B and C.

The emulsions according to the invention frequently also comprise at least one thickener for setting the viscosity required for the respective application. In principle, it is possible to use all thickeners known for thickening oil-in-water systems. These include natural thickeners such as polysaccharides, carrageenates, tragacanth, alginates, starch, caseinates, modified organic polymers such as carboxymethyl-cellulose, synthetic thickeners such as polyacrylic acids, polyvinyl alcohol, polyethylene glycols, polyacrylamides, and, in particular, copolymers of acrylamide with ethylenically unsaturated carboxylic acids, in particular with acrylic acid, and optionally with comonomers. These thickeners are described in EP-A 149 812, the disclosure of which is hereby referred to. Further suitable thickeners are mentioned in the overview article by Warren B. Shapiro, Oil-in Water-Emulsions, Cosmetics & Toiletries, vol. 97, 1982, 27-33. Particular preference is also given to so-called associative thickeners, e.g. hydrophobically modified polyurethanes, hydrophobically modified cellulose ethers, which build up high molecular weight network structures in accordance with the principle of hydrophobic interaction in aqueous phase. Associative thickeners are known to the person skilled in the art, e.g. J. Bielemann, Additives for Coatings, Wiley-VCH, Weinheim, 2000 and are commercially available, e.g. under the names RHOPLEX® and PRIMAL® TT 935 from Rohm & Haas, USA. In one preferred embodiment of the invention, the emulsions comprise no thickener.

In addition, the emulsions according to the invention also frequently comprise commercially available biocides for preservation, e.g. formaldehyde, isothiazole compounds and the products sold by ICI under the name PROXEL®.

To prepare the emulsion according to the invention, as a rule the oil phase will be emulsified in the aqueous phase. This takes place in a manner known per se analogously to methods for producing emulsions. Typically use is made for this purpose of emulsifying apparatuses, e.g. dispersing devices, in which the components of the emulsion are subjected to a considerable shear gradient. In order to obtain particularly stable oil-in-water emulsions, the emulsification of the oil phase in the aqueous phase is preferably carried out in the presence of surface-active substances.

Emulsifying the oil phase into the aqueous phase gives oil-in-water emulsions. Immediately after preparation, these generally have a viscosity in the range from 300 to 3000 mPas. The average particle size of the oil droplets (weight average of the droplet diameter) of the oil-in-water emulsion is generally below 25 μm, preferably in the range from 0.1 to 20 μm, in particular 0.5 to 15 μm, specifically 1 to 10 μm, determined by means of light scattering at 20° C. The solids content of the oil-in-water emulsion is in a range from 10 to 50% by weight, preferably 20 to 40% by weight, as can be determined e.g. by means of back-weighing after drying.

The oil-in-water emulsions according to the invention can be used as antifoams and/or deaerators for controlling foam and/or deaeration of aqueous compositions for example in the food industry, the starch industry, in waste treatment plants or in the paper industry. Preference is given to their use as borehole solution and in the paper industry, in particular during pulp cooking, pulp washing, the grinding of paper stock, papermaking and the dispersion of pigments for papermaking. Specifically, the oil-in-water emulsions according to the invention are used in the paper industry as deaerators for aqueous paper stock suspensions. Particular preference is given here to the use as deaerators of the headbox in papermaking.

As antifoams or deaerators, the oil-in-water emulsions are generally used in amounts of from 0.01 to 2 parts by weight per 100 parts by weight of the foam-forming aqueous liquid, preferably in amounts of from 0.02 to 1 part by weight per 100 parts by weight of the foam-forming liquid, in particular in amounts of from 0.05 to 0.5 parts by weight per 100 parts by weight of the foam-forming liquid.

The advantages of the emulsions according to the invention are evident particularly at temperatures in the range from 20 to 50° C.

The examples below are intended to illustrate the invention in more detail and are not to be understood as being limiting.

Physicochemical Test Methods

The average particle size (d50) of the particles of the oil phase emulsified in water was determined with the help of a Coulter counter from Beckmann.

The viscosity was determined using a Brookfield rotary viscometer model RVT, spindle 4 at 20 revolutions per minute at 25° C.

The solids content was determined by back-weighing the samples following storage in a drying cabinet at 110° C. to constant weight.

The average air content was determined by pumping in each case 10 l of a foam-developing paper stock suspension 0.1% (groundwood) in a container made of a transparent plastic for 5 minutes. The amount of air formed in the stock suspension was then ascertained using an air measuring device (e.g. based on impedance methods as in the case of the Sonica device from Conrex or based on sonic speed measurements as in the case of Sonatrac from Cidra). To assess the effectiveness of a deaerator, the average air content was stated 5 minutes after adding the deaerator.

If the paper suspension is pumped round in the absence of an antifoam for 5 minutes, then an average air content of 4% is obtained. By adding in each case 5 mg/l of an effective deaerator to the paper stock suspension, this value is significantly reduced, meaning that it is a measure of the effectiveness of a deaerator.

After testing, the temperature of the paper stock suspension in each case was 30, 40 or 50° C., the temperature being kept constant to +/−1° C. during the 5 minute test. In this terminology, the more effective the antifoam, the lower the average air content in the paper stock suspension.

The parts stated in the examples are parts by weight.

The $C_{20+}$-fatty alcohol mixture used below as component A1 consists to 6% by weight of a linear $C_{18}$-alcohol, to 50% by weight of a linear $C_{20}$-alcohol, to 29% by weight of a linear $C_{22}$-alcohol, to 14% by weight of a linear $C_{24}$-alcohol and to 3% by weight of a linear $C_{26}$-alcohol. The melting range of this mixture is 53 to 58° C.

Hereinbelow, the glycerol stearates with the following composition were used as component A2:

It is a mixture of 50 to 75% by weight of monoester of glycerol and 25 to 50% by weight of the diester of glycerol with a $C_{16}/C_{18}$ carboxylic acid mixture which consists for example of 40 to 70% by weight of palmitic acid and to 30 to 60% by weight of stearic acid. The iodine number is less than 2 g of $I_2$/100 g. The acid number is less than 10 mg KOH/g.

Glycerol stearate 1 is a glycerol stearate sold under the name glycerol monostearate by Faci SpA.

Glycerol stearate 2 is a glycerol stearate sold under the name Radiamuls MG 2143 by Oleon N.V. or by Brenntag Polska.

The polyglycerol ester is an esterification product of a polyglycerol mixture consisting of 27% diglycerol, 44% triglycerol, 19% tetraglycerol and 10% more highly condensed polyglycerols with behenic acid which has an acid number <10 mg/g KOH.

Commercially available rapeseed oil or commercially available palm oil was used as component C.

The surface-active substances used were the emulsifier Emulan TO 4070, a mixture of ethoxylated fatty alcohols, commercially available via BASF SE.

The thickener used was an aqueous 1% strength xanthan solution.

The biocides used were formaldehyde and Proxel®, which is based on the active ingredient 1,2-benzisothiazolin-3-one and is sold by Arch.

EXAMPLE 1

The components of the oil phase were firstly heated to a temperature of 100 to 110° C. and then incorporated into the aqueous phase heated to 80° C. to 95° C. by means of a dispersing device and then cooled to 25° C. with an ice bath. The resulting emulsion was then filtered.

The oil phase had the following composition, based on the total weight of the emulsion:

9.2 parts of the $C_{20+}$-fatty alcohol mixture,
9.2 parts of glycerol distearate
7.3 parts of rapeseed oil,
1.6 parts of polyglycerol ester,
0.1 part of formaldehyde (30% strength)
0.1 part of Proxel®.

The water phase consisted, based on the total weight of the emulsion, of:
46.9 parts of water,
25 parts of xanthan (1% strength),
0.6 part of the emulsifier Emulan TO 4070 (70% strength)

The examples and comparative examples given in table 1 were prepared in an analogous manner. The quantitative data are % by weight, based on the total weight of the emulsion. The composition of the water phase corresponded in all examples to the water phase of example 1. The physical properties and the deaerating effect of this emulsion are given in table 2.

TABLE 1

Composition of the examples and comparative examples

| Component | Example 1 | 2 | 3 | C1 | C2 | C3 |
|---|---|---|---|---|---|---|
| $C_{20+}$-Fatty alcohol mixture | 9.2 | 9.2 | 9.2 | 18.4 | — | — |
| Glycerol stearate 1 | 9.2 | — | — | — | 18.4 | — |
| Glycerol stearate 2 | — | 9.2 | 9.2 | — | — | 18.4 |
| Polyglycerol ester Emulsifier | 1.6 | 1.6 | 1.6 | 1.6 | 1.6 | 1.6 |
| Rapeseed oil | 7.3 | 7.3 | — | 7.3 | 7.3 | 7.3 |
| Palm oil | — | — | 7.3 | — | — | — |
| Biocides | 0.2 | 0.2 | 0.2 | 0.2 | 0.2 | 0.2 |
| Water | 46.9 | 46.9 | 46.9 | 46.9 | 46.9 | 46.9 |

TABLE 2

Physical properties and deaerating effect of the antifoams

| | Average particle size ($d_{50}$) [µm] | pH | Viscosity [mPas] | Solids content [%] | Air content [%] 40° C. |
|---|---|---|---|---|---|
| 1 | 2.3 | 7.3 | 1200 | 28.9 | 0.21 |
| 2 | 3.2 | 6.4 | 2320 | 27.7 | 0.23 |
| 3 | 3.2 | 6.5 | 2360 | 28.1 | 0.28 |
| C1 | 2.8 | 7.1 | 630 | 28.0 | 0.60 |
| C2 | 3.7 | 7.1 | 1130 | 28.7 | 0.76 |
| C3 | 2.7 | 6.3 | 3330 | 27.9 | 0.79 |

We claim:

1. An oil-in-water emulsion comprising:
an aqueous phase and
an oil phase,
wherein the oil phase comprises at least 95% by weight of components A, B and C:
A) from 40 to 95% by weight, based on a total weight of the oil phase, of a mixture comprising:
A1) an alkanol having 12 to 30 carbon atoms, and
A2) a mono- or diester of glycerol with at least one fatty acid having 14 to 22 carbon atoms; comprising at least 80% by weight, based on a total weight of component A2, of a mono- or diester of glycerol with at least one linear $C_{16}$-$C_{22}$-alkanecarboxylic acid,
wherein a weight ratio of the alkanol to the mono- or diester of glycerol with at least one fatty acid having 14 to 22 carbon atoms is of from 1:3 to 3:1;
B) from 0.1 to 10% by weight, based on the total weight of the oil phase, of a component, which is at least one selected from the group consisting of an ester of a $C_{12}$-$C_{36}$-alkanecarboxylic acid with polyglycerol, an amide of a $C_{12}$-$C_{36}$-alkanecarboxylic acid with an alkylenediamine or an oligoalkyleneamine, and an ester of a $C_{12}$-$C_{36}$-alkanecarboxylic acid with a $C_{12}$-$C_{36}$-alkanol,
C) from 4.9 to 50% by weight, based on the total weight of the oil phase, of an organic substance other than component A,
wherein the organic substance is liquid at 50° C. and 1013 mbar,
at atmospheric pressure, the organic substance has a boiling point above 200° C., and
at 25° C. and 1013 mbar, the organic substance has a solubility in water of less than 0.1 g/l.

2. The oil-in-water emulsion according to claim 1, wherein component A1) comprises at least 80% by weight of a linear alkanol having 16 to 26 carbon atoms.

3. The oil-in-water emulsion according to claim 1, wherein the component B comprises at least 80% by weight, based on a total weight of component B, of an ester of at least one $C_{18}$-$C_{24}$-alkanecarboxylic acid with polyglycerol.

4. The oil-in-water emulsion according to claim 3, wherein the ester of at least one $C_{18}$-$C_{24}$-alkanecarboxylic acid with polyglycerol is obtained by esterification of polyglycerol with behenic acid.

5. The oil-in-water emulsion according to claim 1, wherein the organic substance comprises at least 80% by weight, based on a total weight of component C, of an aliphatic hydrocarbon oil.

6. The oil-in-water emulsion according to claim 1, wherein a solids content of the oil-in-water emulsion is of from 10 to 50%, based on a total weight of said emulsion.

7. The oil-in-water emulsion according to claim 1, a weight-average particle size of oil droplets of the oil-in-water emulsion is of from 0.5 to 10 µm.

8. A method for reducing foam or air in a composition, the method comprising:
adding the oil-in-water emulsion according to claim 1 to a composition.

9. The method according to claim 8,
wherein said oil-in-water emulsion is added to said composition at a temperature of from 20 to 50° C.

10. A method for deaerating an aqueous paper stock suspension, the method comprising:
adding the oil-in-water emulsion according to claim 1 to an aqueous paper stock suspension.

11. A method for deaerating a headbox in papermaking, the method comprising:
adding the oil-in-water emulsion according to claim 1 to a headbox in papermaking.

12. An oil-in-water emulsion comprising:
an aqueous phase and
an oil phase,
wherein the oil phase comprises at least 95% by weight of components A, B and C:
A) from 40 to 95% by weight, based on a total weight of the oil phase, of a mixture comprising:
A1) an alkanol having 12 to 30 carbon atoms, comprising at least 80% by weight of a linear alkanol having 16 to 26 carbon atoms, and
A2) a mono- or diester of glycerol with at least one fatty acid having 14 to 22 carbon atoms; comprising at least 80% by weight, based on a total weight of component A2, of a mono- or diester of glycerol with at least one linear $C_{16}$-$C_{22}$-alkanecarboxylic acid,
wherein a weight ratio of the alkanol to the mono- or diester of glycerol with at least one fatty acid having 14 to 22 carbon atoms is of from 1:3 to 3:1;
B) from 0.1 to 10% by weight, based on the total weight of the oil phase, of a component, which is at least one selected from the group consisting of an ester of a $C_{12}$-$C_{36}$-alkanecarboxylic acid with polyglycerol, an amide of a $C_{12}$-$C_{36}$-alkanecarboxylic acid with an alkylenediamine or an oligoalkyleneamine, and an ester of a $C_{12}$-$C_{36}$-alkanecarboxylic acid with a $C_{12}$-$C_{36}$-alkanol, C) from 4.9 to 50% by weight, based on the total weight of the oil phase, of an organic substance other than component A, wherein the organic substance is liquid at 50° C. and 1013 mbar, at atmospheric pressure, the organic substance has a boiling point above 200° C., and at 25° C. and 1013 mbar, the organic substance has a solubility in water of less than 0.1 g/l, wherein a fraction of A1 and A2 in said oil phase is 50 to 80% by weight, and component B comprises at least 80% by weight, based on a total weight of component B, of an ester of at least one $C_{18}$-$C_{24}$-alkanecarboxylic acid with polyglycerol.

13. The oil-in-water emulsion according to claim 12, wherein the organic substance comprises at least 80% by weight, based on a total weight of component C, of an aliphatic hydrocarbon oil.

14. The oil-in-water emulsion according to claim 13, wherein said aliphatic hydrocarbon oil is at least one oil selected from the group consisting of a vegetable oil and an animal oil.

* * * * *